(12) United States Patent
London

(10) Patent No.: US 12,290,218 B2
(45) Date of Patent: May 6, 2025

(54) SYSTEMS AND METHODS FOR A SMART PUMP

(71) Applicant: Vanessa London, Encinitas, CA (US)

(72) Inventor: Vanessa London, Encinitas, CA (US)

( * ) Notice: Subject to any disclaimer, the term of this patent is extended or adjusted under 35 U.S.C. 154(b) by 258 days.

(21) Appl. No.: 18/046,889

(22) Filed: Oct. 14, 2022

(65) Prior Publication Data

US 2023/0119899 A1    Apr. 20, 2023

Related U.S. Application Data

(60) Provisional application No. 63/255,920, filed on Oct. 14, 2021.

(51) Int. Cl.
| | |
|---|---|
| A47K 5/12 | (2006.01) |
| G01F 11/28 | (2006.01) |
| G06K 19/06 | (2006.01) |
| A61Q 17/04 | (2006.01) |

(52) U.S. Cl.
CPC .......... *A47K 5/1217* (2013.01); *A47K 5/1205* (2013.01); *G01F 11/28* (2013.01); *G06K 19/06037* (2013.01); *A61Q 17/04* (2013.01)

(58) Field of Classification Search
CPC .... G01F 25/0084; G01F 11/028; A61Q 17/04
USPC ........................................................ 222/309
See application file for complete search history.

(56) References Cited

U.S. PATENT DOCUMENTS

| | | | | |
|---|---|---|---|---|
| 1,913,062 | A * | 6/1933 | Wheeler | G01F 11/028 222/38 |
| 3,653,556 | A * | 4/1972 | Moran | G01F 11/06 222/530 |
| 6,112,779 | A * | 9/2000 | Camilla | B01L 3/0282 222/49 |
| 10,814,148 | B2 * | 10/2020 | Poutiatine | A61B 5/0077 |
| 11,748,800 | B1 * | 9/2023 | Yuan | A61Q 19/005 705/26.7 |
| 2005/0072808 | A1 * | 4/2005 | Kitamura | B05B 11/1001 222/309 |
| 2014/0091001 | A1 * | 4/2014 | Chan | B42D 15/00 283/67 |
| 2015/0313532 | A1 * | 11/2015 | Marinkovich | A61B 5/486 600/306 |
| 2016/0256369 | A1 * | 9/2016 | Dutton | A61K 8/31 |
| 2017/0151391 | A1 * | 6/2017 | Hernandez | A61M 5/31525 |
| 2019/0060678 | A1 * | 2/2019 | Poutiatine | A61Q 17/04 |
| 2020/0188708 | A1 * | 6/2020 | Myslinski | A61Q 17/04 |
| 2020/0406067 | A1 * | 12/2020 | Brandt | G16H 20/10 |

FOREIGN PATENT DOCUMENTS

DE     102013109658 B3 *  9/2014   .......... A45D 33/008

* cited by examiner

*Primary Examiner* — Mollie Impink
(74) *Attorney, Agent, or Firm* — Mahesh Law Group PC; Kumar Maheshwari

(57) ABSTRACT

Systems, methods, and a sunscreen container are disclosed. A sunscreen container includes a reservoir for holding a volume of sunscreen and a hand pump in fluid connection with the reservoir. The sunscreen container further includes a moving portion of the hand pump comprising outward facing numerical markings that indicate a volume of sunscreen that is pumped based on a movement of the hand pump.

16 Claims, 14 Drawing Sheets

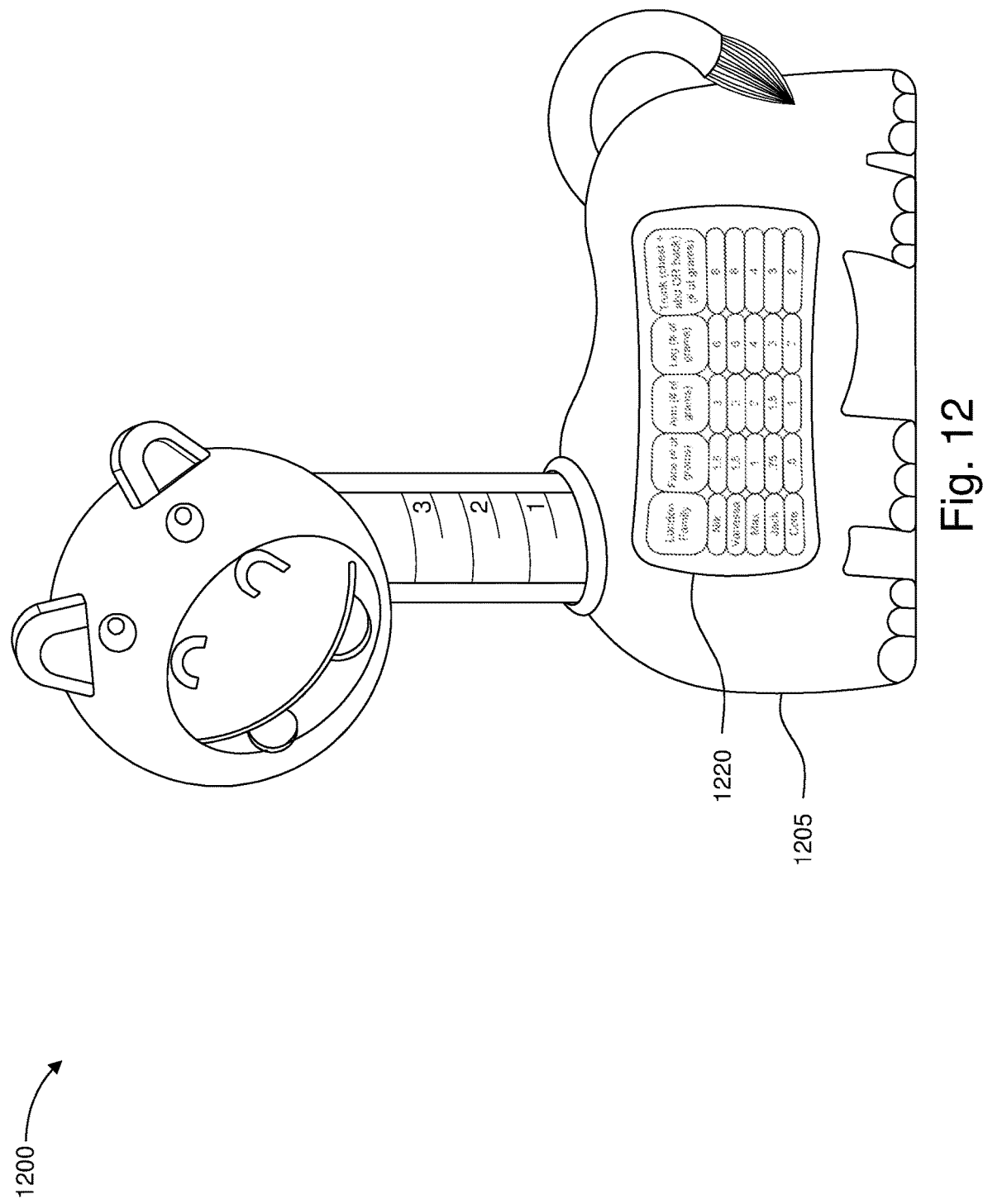

SYSTEMS AND METHODS FOR A SMART PUMP

CROSS REFERENCE TO PRIOR APPLICATION

This application claims the benefit of U.S. Provisional Patent Application No. 63/255,920, entitled as "SYSTEMS AND METHODS FOR A SMART PUMP", filed Oct. 14, 2021, which is incorporated by reference in its entirety.

FIELD OF THE INVENTION

This disclosure relates to the field of pump containers for sunscreen, lotion, body wash, cosmetics, and the like.

BACKGROUND

Almost every medication comes with a dose which is the specific and accurate amount that one should take in order to receive a desired benefit. Sunscreen is regulated by the FDA. It is considered an over-the-counter drug and it should have specific, clear, and practical dosages for all patients.

There have been attempts at describing the dosage or amount that one should apply, but clinical studies have shown us that people don't use these methods. There are two methods frequently seen in marketing and in the literature: The first is the fingertip unit, which is to describe 0.5 grams, or the amount that would need to cover two hands or 1.6% BSA. The shot glass or golf ball reference represents how much 30 ml is, which is the recommended amount for the entire body surface for an average adult. There are no guidelines on how much sunscreen a child or infant should use, or an adult who is not "average" size. Further, there are studies showing that the average American applies much less than the amount that is used in the clinical studies of sunscreen to achieve the sun protection factor (SPF) written on the label. In the sunscreen studies, participants apply sunscreen at a thickness of 2 mg/cm$^2$, and there have been no attempts by current sunscreens to teach or enable customers to apply the proper amount to themselves.

SUMMARY

A method, system and apparatus for a smart pump are disclosed herein. An exemplary embodiment is a sunscreen container. The sunscreen container includes a reservoir for holding a volume of sunscreen and a hand pump in fluid connection with the reservoir. The sunscreen container includes a moving portion of the hand pump that includes outward facing numerical markings that indicate a volume of sunscreen that is pumped based on a movement of the hand pump. The sunscreen container may further include an outward facing digital label where the digital label contains instructions that, when executed on a mobile device, cause the mobile device to connect to a sunscreen calculating application. The sunscreen calculating application may determine an amount of sunscreen to apply to an individual based on an exposed skin surface area of the individual. The exposed skin surface area may be determined by a set of variables that include an age of the individual, a sex of the individual, a height of the individual, and a weight of the individual. The set of variables may further include a clothing coverage of the individual. The set of variables may further include a baldness of the individual. The sunscreen calculating application may include an instruction that, when executed, causes a printer to print a sticker that is shaped to be affixed to the sunscreen container. The sticker may include a numerical print of the amount of sunscreen to apply to the individual.

Another general aspect is a method for providing sunscreen to an individual. The method includes providing the individual with a sunscreen container where the sunscreen container includes a reservoir for holding a volume of sunscreen and a hand pump in fluid connection with the reservoir. The sunscreen container further includes a moving portion of the hand pump comprising outward facing numerical markings that indicate a volume of sunscreen that is pumped based on a movement of the hand pump and an outward facing QR code, the QR code containing instructions that, when executed on a mobile device, cause the mobile device to connect to a sunscreen calculating application. The method further includes receiving a request from the mobile device to determine an amount of sunscreen to apply to an exposed skin surface area of the individual where the request includes a set of one or more variables to determine the exposed skin area of the individual. The method further includes determining an amount of sunscreen to apply to one or more body parts of the individual and printing a sticker that is shaped to be affixed to the sunscreen container where the sticker displays one or more distances that the moving portion of the hand pump may be depressed to produce the amount of the sunscreen to apply to the one or more body parts where the one or more distances correspond to the numerical markings. The set of variables may include an age of the individual, a sex of the individual, a height of the individual, and a weight of the individual. The set of variables may further include a clothing coverage of the individual. The set of variables may further include a baldness of the individual. The one or more distances may include a distance for a face body part, a distance for an arm body part, a distance for a leg body part, and a distance for a trunk body part. The one or more distances may further include a distance for a head body part.

An exemplary embodiment is a system for providing an accurate dose of sunscreen to an individual. The system includes a sunscreen container where the sunscreen container includes a reservoir for holding a volume of sunscreen and a hand pump in fluid connection with the reservoir. The sunscreen container further includes a moving portion of the hand pump that includes outward facing numerical markings that indicate a volume of sunscreen that is pumped based on a movement of the hand pump and an outward facing QR code, the QR code containing instructions that, when executed on a mobile device, cause the mobile device to connect to a sunscreen calculating application. The system further includes a server with a processor and memory where the memory includes instructions that, when executed by the processor, cause the processor to receive a request from the mobile device to determine an amount of sunscreen to apply to an exposed skin surface area of the individual where the request includes a set of one or more variables to determine the exposed skin area of the individual. The instructions further cause the processor to determine an amount of sunscreen to apply to one or more body parts of the individual and print a sticker that is shaped to be affixed to the sunscreen container where the sticker displays one or more distances that the moving portion of the hand pump may be depressed to produce the amount of the sunscreen to apply to the one or more body parts, the one or more distances corresponding to the numerical markings. The set of variables may include an age of the individual, a sex of the individual, a height of the individual, and a weight of the individual. The set of variables may further include a clothing coverage of the individual. The set of variables may further include a baldness of the individual. The one or more distances may include a distance for a face body part, a distance for an arm body part, a distance for a leg body part, and a distance for a trunk body part. The one or more distances may further include a distance for a head body part.

BRIEF DESCRIPTION OF THE DRAWINGS

FIG. 12 is an illustration of a stylized embodiment of the sunscreen container with an affixed sticker that is printed according to an embodiment of the disclosed subject matter.

DETAILED DESCRIPTION

Figure 1:
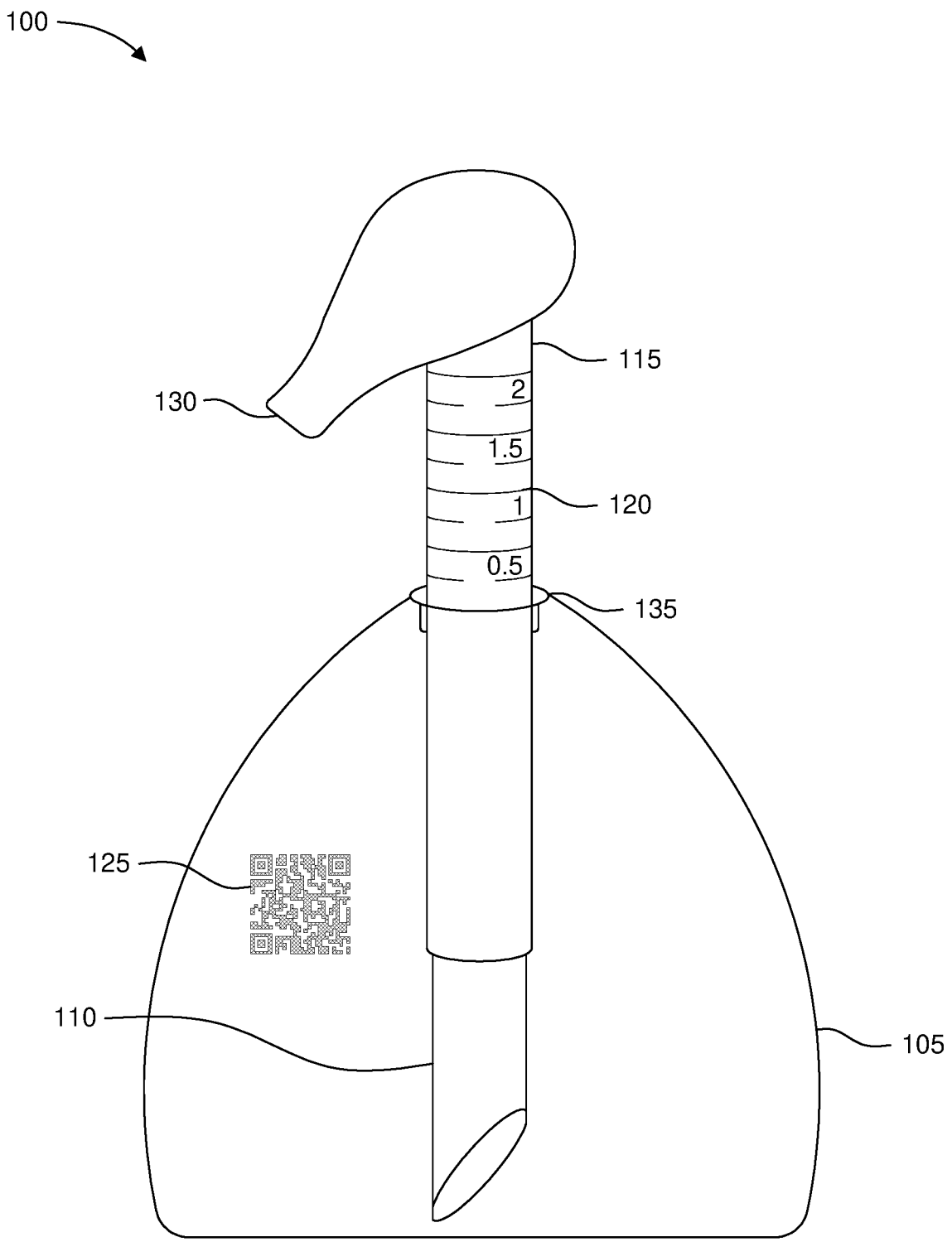
FIG. 1 is an illustration of an embodiment of a sunscreen container.

The disclosed subject matter is a bottle or container for sunscreen that is designed to provide users with an accurate dose of sunscreen. The bottle may be used with an online application that calculates the accurate dose. The bottle and online application together provide an accurate calculation of a correct dosage of sunscreen as well as a means to easily and accurately measure the correct dosage.

An online application may be accessed via a digitally readable label such as a QR code that is affixed to the bottle of sunscreen. The QR code may contain instructions that cause a scanning device, such as a mobile phone, to open a web application. Once the web application is accessed by the scanning device, one or more variables related to an amount of exposed surface area may be entered by a user of the scanning device. The web application may calculate an exposed skin area of one or more individuals based on well-known formulas for the calculation of skin area and subtracting various fractions of the skin area based on hair and clothing.

The bottle includes a hand pump actuator that allows a user to measure a precise mass of sunscreen. On the neck of the hand pump actuator are syringe type markings that correspond to a distance that the actuator is depressed. Once the user is provided with a correct dosage, the user may actuate the hand pump based on the markings to easily pump the correct dosage. In an exemplary embodiment, the syringe style markings may form an impression upon the actuator such that the markings make an audible click as the actuator is depressed. Thus, the user may listen for the dosage.

The bottle may be of various sizes and shapes based on factors such as the body part(s) to which the sunscreen is being applied and the individual preferences of the user. For instance, an embodiment of the bottle may be designed for easy application to the face of an individual. Because the face requires proportionally less sunscreen, the reservoir size of the face application embodiment may be smaller than other embodiments. An exemplary embodiment comprises a larger bottle for which the intended use is to apply sunscreen to the entire exposed skin area on an individual including, but not limited to the head, chest, abdomen, neck, back, upper legs, lower legs, and feet.

The digitally readable label may be located at various locations such as on the back of the bottle, allowing a user to place stickers with a readable sunscreen amount on the front of the bottle. Connecting to the web application through the digitally readable label provides a user with an amount of sunscreen to apply to various body parts. Variables that are used to calculate an exposed skin surface area and provide the amount of sunscreen include, but are not limited to age, height, weight, sex, baldness, hairstyle, and clothing.

Formulas that may be used to calculate the exposed skin surface area include the Haycock formula whereby the body surface area ("BSA") is determined by:

$$BSA = 0.024265 * W^{0.5378} * H^{0.3964} \quad (1)$$

where W is the weight and H is the height of the individual. The Haycock formula is disclosed in Haycock G B, Schwartz G J, Wisotsky D H "Geometric method for measuring body surface area: A height-weight formula validated in infants, children and adults" J Pediatr 1978, 93:62-66. Another formula for determining the BSA, shown in Equation 2 below is the Mosteller formula:

$$BSA = 0.016667 * W^{0.5} * H^{0.5} \quad (2)$$

The Mosteller formula is disclosed in Mosteller R D. "Simplified calculation of body-surface area". N Engl J Med 1987; 317:1098. PMID 3657876. Various other equations which are not disclosed herein may be implemented for determining the BSA. In an exemplary embodiment, the Haycock formula is used to determine the BSA for children between the ages of 6 months to 2 years old. The Mosteller formula is used if an individual's body mass index ("BMI") is greater than 85%. And for individuals above the age of 2 that have a normal weight or are underweight, BSA is calculated from an average of the Haycock formula and the Mostellar formula.

The BSA may be output in units of centimeters squared ($cm^2$). The amount of sunscreen that is used in sunscreen trials is 2 milligrams per centimeter squared (2 $mg/cm^2$). Accordingly, the BSA is multiplied by 2 $mg/cm^2$ to determine an amount of sunscreen to apply in milligrams. As the calculation for BSA is for the entire body, the total amount may be broken down into fractions of the total BSA by body part. In an exemplary embodiment, the percent of a total BSA for each body part may be estimated by a rule of 9's whereby the face area including the face, neck, ears and any scalp accounts for 9% of BSA, the right and left arms account for 9% of BSA individually, the right and left legs account for 18% of BSA individually, the entire front of the trunk which includes the chest and abdomen accounts for 18% of BSA, and the entire back of the trunk accounts for 18% of BSA.

Additional adjustments may be made to the determined amounts of sunscreen for the various body parts based on hair and clothing. The adjustments may subtract from the portion of the BSA of each body part, a percentage based on coverage of the skin. For example, an individual wearing a short sleeve shirt will not require any sunscreen for the front and back trunk and will only require half of the BSA determined amount of sunscreen for the arms. In another example related to hair coverage, a determination of the amount of sunscreen for the face area for an individual with a full head of hair may be based on 4% of the BSA instead of 9% of the BSA. A level of balding may be taken into account to determine a measurement based on a percentage of BSA in between 4% and 9%. The balding adjustment may be different for men and women. For instance, an amount of balding for women would assume substantially more hair coverage than a corresponding amount of balding for men.

The web application may determine an amount of sunscreen for multiple individuals, such as a family. In an example, the web application may request height, weight, age, sex, baldness, and clothing information for all members of a family. The web application may determine an amount of sunscreen that each member of the family requires. Further, the web application may break down the determination into an amount of sunscreen for the various body parts of the members of the family. In an exemplary embodiment, the web application may output a table with amounts of sunscreen for the various body parts of a group of individuals.

In various embodiments, the web application may comprise three main parts. The first part may, as described above, determine an accurate dosage of sunscreen based on sex, age, height, and weight of a group of individuals such as a family. The web application may further create a label that is configured to be affixed to the side of the bottle. Accurate dosages for the various body parts of each of the individuals in the group may be listed on the label.

In the second part, the label may be customized based on the user's preferences. For instance, the user may select which individuals in the group to place on the label. The user may select sub-categories of body parts to place on the label. Further, the user may include clothing or hairstyle variations. For example, if the individual wants to wear a short sleeve rash guard, then the amount of sunscreen may be estimated for the uncovered portion of the arms. In another example, an amount of sunscreen that an individual applies to their legs may be dependent on the length of their shorts that they wear that day. Designs may be added to the label to aid family members in separating their individual sunscreen amounts from those of the rest of the family. In various embodiments, names and logos of organizations such as charities may be appended to the label.

In various embodiments, one or more parts of the label may be left blank so that the user may fill it out. For example, the amounts of sunscreen for the various body parts may be intentionally left blank so the user may fill them in. In one instance, the web application may instruct the user as to the correct amounts to be filled in for the various body parts. In another example, the web application may instruct the user to fill in a number of pumps corresponding to a rounded-up number of full pumps to pump a correct amount of sunscreen. The number of full pumps may be used in the absence of a specific mass or volume to simplify the process of pumping for an individual.

In the third part, additional options may be selected to complete a session on the web application. An example of an additional option may be to select recurring shipments for replacement bottles of sunscreen. The replacement bottles may include the label already affixed to a side. Another additional option may be to select physical or chemical ingredients for the sunscreen. For instance, a user may select a chemical ingredient such as homosalate or avobenzone for the sunscreen. Alternatively, a user may select physical ingredients that reflect UV radiation such as zinc oxide and titanium dioxide. The web application will be instructed to automatically remind a user when ingredients in a current bottle have expired or are about to expire.

Further, a user may be presented with options to order bottles with ingredients to reduce redness, brighten and rejuvenate skin, reduce puffiness, reduce undereye circles, reduce undereye darkness, decrease acne, even out pigmentation, and decrease wrinkles. Ingredients that may reduce redness include niacinamide and azelaic acid. Ingredients that may brighten and rejuvenate skin include kojic acid and azelaic acid. Caffeine may be included to reduce puffiness and decrease undereye circles. Black licorice may be included to reduce undereye darkness and azelaic acid may be included to decrease acne. Ingredients that even pigmentation may include azelaic acid and glycolic acid. Retinol may be included to decrease wrinkles, rejuvenate skin and exfoliate.

Some additional ingredients may include a proper dosage. For instance, ingredients intended to perform additional treatments may include a dosage that is calculated according to current medical recommendations and the variable characteristics of individuals as disclosed herein for sunscreen. In one example, a dosage for black licorice may be calculated to reduce undereye darkness based on variables that are entered for an individual. Further, the ingredients may be presented in a bottle with a smart pump as disclosed herein that allows a user to pump the precise dosage.

Referring to FIG. 1, FIG. 1 is an illustration of an embodiment of a sunscreen bottle 100. The sunscreen bottle 100 may include a reservoir 105 that is configured to hold a volume of sunscreen, lotion, or similar substance that may be applied to the skin of an individual. Sunscreen comprises various mixtures which may be applied to the skin of an individual to prevent or slow the rate at which the individual's skin develop a first degree burn when exposed to UV radiation.

The various mixtures of sunscreen may include an active ingredient that reflects or absorbs UV radiation. Active ingredients that reflect UV radiation may be referred to as physical ingredients. Examples of physical ingredients include zinc oxide and titanium dioxide. Active ingredients that absorb UV radiation may be referred to as chemical ingredients. A large number of organic molecules may be used as chemical ingredients. Some examples of chemical ingredients include avobenzone, octisalate, and oxybenzone.

Sunscreen may be applied in various ways such as slathering it onto skin and rubbing it until it coats the skin evenly. The FDA recommends that sunscreen be applied at a concentration of 2 milligrams (mg) of sunscreen per square centimeter ($cm^2$) of exposed skin. However, many individuals may have difficulty in measuring the correct amount of sunscreen. Generally, most individuals are forced to guess the correct amount as they have no easy way of measuring the amount of sunscreen that they apply to their body, nor do they have an easy way of measuring the area of their exposed skin.

To aid individuals in measuring an amount of sunscreen, the sunscreen bottle 100 includes a hand pump that is designed to inform a user of an amount of sunscreen that is expelled from the sunscreen bottle 100 with each pump of the hand pump. The hand pump includes an inlet 110 that is submerged with the sunscreen or other mixture. The hand pump further includes a moving portion 115 that a user depresses to activate a pumping of sunscreen from the inlet 110 to an outlet 130. The moving portion 115 includes syringe style markings 120 on a neck area. The syringe style markings 120 may represent a mass or volume of sunscreen that is expelled from the hand pump. When the moving portion of the hand pump is depressed, the syringe style markings 120 may move downward past a non-moving measurement line 135. In various embodiments, the non-moving measurement line 135 is at a point where a non-moving portion of the sunscreen bottle 100 overlaps with the moving portion 115.

In various embodiments, the reservoir 105 contains enough space to accommodate the full neck of the moving portion 115 when the hand pump is fully depressed. In an exemplary embodiment, the syringe style markings comprise physical prominences or impressions that produce an audible click as each syringe style marking passes the non-moving measurement line 135. For example, the syringe style markings may comprise plastic projections that make contact with the non-moving portion of the sunscreen bottle 100 to produce an audible click. Thus, a user may pump a precise amount of sunscreen by listening to clicking noises made as sunscreen is pumped from the bottle.

In addition to measuring a precise amount of sunscreen, the sunscreen bottle 100 also informs a user of a correct dosage of the sunscreen based on the surface area of exposed skin on an individual. The sunscreen bottle 100 includes a digital label 125, such as a QR code, that when scanned by a mobile device, causes the mobile device to open a web application. The web application may prompt the user of the mobile device to enter one or more variables to determine an exposed skin area for an individual and calculate a dosage of sunscreen to apply to the individual.

Figure 2A:
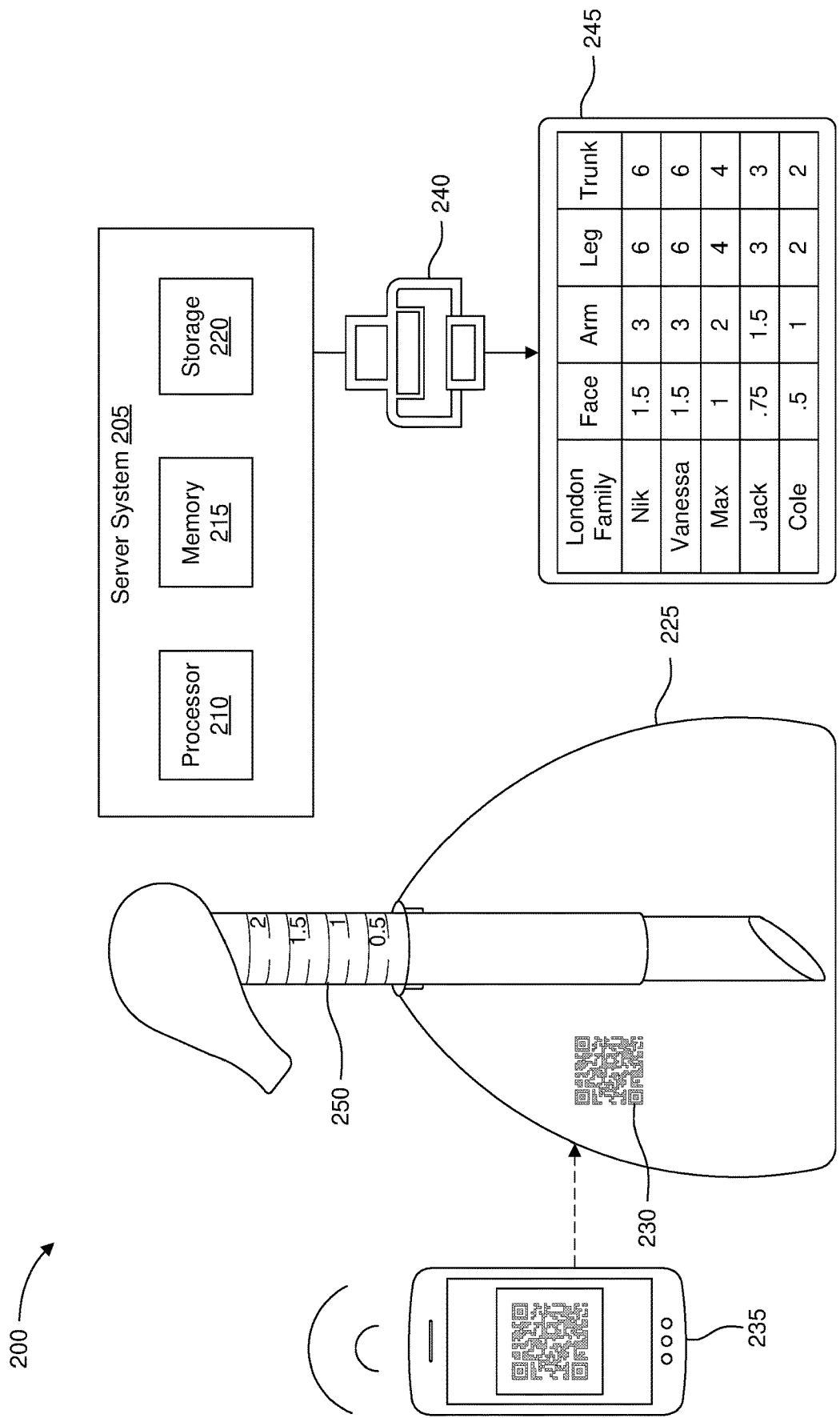
FIG. 2A is a schematic for an embodiment of a system for providing sunscreen to an individual.
Figure 2B:
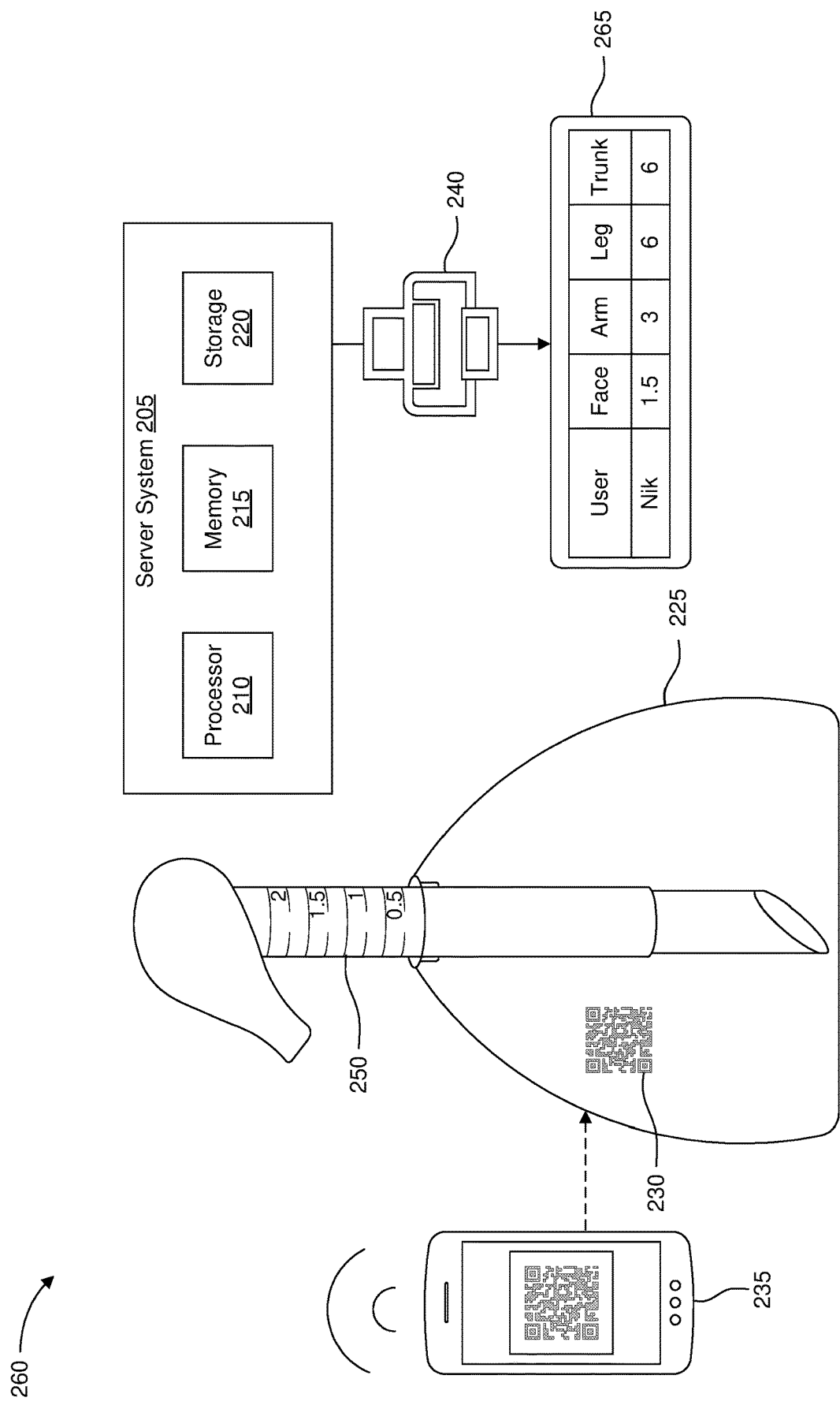
FIG. 2B is a schematic for an embodiment of a system for providing sunscreen to an individual.

Referring to FIG. 2A and FIG. 2B, FIG. 2A is a schematic for an embodiment of a system 200 for providing sunscreen to an individual. The system 200 includes a sunscreen bottle 225 with a hand pump that has syringe style markings 250. The syringe style markings 250 allow a user to measure a precise amount of sunscreen by observing the lowest visible marking when a hand pump is depressed. The sunscreen bottle 225 also includes a digital label 230, such as a QR code, that is scannable by a mobile device 235. A QR code is a two dimensional bar code that contains data. In an exemplary embodiment, a sunscreen bottle 225 includes a QR code that, when scanned by the mobile device 235, causes the mobile device to open a web application.

The mobile device 235 may be an electronic device with a processor, memory, and storage. The mobile device 235 may be capable of executing instructions that are encoded in the digital label. For instance, the mobile device may be capable of connecting to a web application through the internet. Further, the mobile device may include a sensor, such as a camera, that is capable of scanning the digital label 230. The mobile device may further include one or more inputs for accepting input from the user. The web application, which may be opened responsive to scanning the QR code, may prompt a user to enter one or more variables that allows the web application to calculate an accurate sunscreen dosage for one or more individuals.

In an exemplary embodiment, the web application may determine a dosage based on the exposed skin area of an individual. The total skin area may be calculated based on various known formulas. For example, the Haycock formula, shown in equation 1 above, may determine a total skin area based on the height and weight of an individual. The Mosteller formula, shown in equation 2 above, is another formula for determining the total skin area based on the height and weight of an individual.

After determining the total skin area, the web application may determine the total exposed skin area for the individual based on portions of the body that are covered such as by hair or clothing. For instance, the web application may prompt the user to enter whether the individual is wearing clothing and the type of clothing. In one example where the user indicates that the individual is wearing a shirt, the web application may prompt the user to specify the length of the shirt sleeves, whether the shirt has a collar, whether the shirt covers the upper chest, whether the shirt covers the back, and whether the shirt covers the abdomen. Similarly, the web application may prompt the user to enter specifics of other items of clothing such as shorts or hats.

In addition to clothing, the web application may prompt a user to enter a level of baldness of an individual to determine how much skin on the head is covered by hair. Hair may cover the top of the head, the forehead, ears, neck, and if sufficiently long, parts of the back. The exposed skin area is then determined by taking the total skin area and subtracting the area that is covered by hair and clothing.

The web application may be run on a server system 205 that includes a processor 210, a memory 215, and a storage 220. The processor 210 may be connected to the memory 215 via a bus and process instructions that are transmitted from the memory 215 to the processor 210. Various types of processors include, but are not limited to central processing units (CPU), graphic processing units (GPU), field programmable gate arrays (FPGA), complex programming logic devices (CPLD), and application specific integrated circuits (ASIC).

The memory 215 transmits instructions to the processor 210 and transmits processed instructions from the processor 210 to various components of the server system 205. Various types of memory 215 include but are not limited to random access memory (RAM) and read only memory (ROM). The processor 210 and memory 215 together may run the web application. A storage 220 may store large amounts data in the long term. For instance, a user profile may be stored in a storage 220 for use at an indeterminant time in the future. The user profile may include the calculated exposed skin area for one or more individuals. Various types of storage include but are not limited to spinning disk drives and solid state drives.

The server system 205 may be connected to a printer 240 that is capable of printing a label 245 for the sunscreen bottle 225. The printer 240 may print a label 245 that includes the calculated amount of sunscreen to apply for an individual or a group of individuals. The label shown in FIG. 2B displays dosages for a single individual. Further, the label 245 may break the calculated amount of sunscreen down to various parts of the body. As shown in the embodiment in FIG. 2A, the label may include a dosage for the face, arm, leg, and trunk, where the trunk represents both the chest and abdomen, as well as entire back area. In various embodiments, the label may have an adhesive that allows the label to be affixed to the sunscreen bottle 225. To create a label, the printer 240 may accept a blank label that is sized to fit on a portion of the sunscreen bottle 225. Further, the blank label may include an adhesive on a back side of the blank label.

As shown in the label 245, the web application may determine a dosage of sunscreen for a group of individuals that share the sunscreen bottle 225. In an exemplary embodiment, the user of the mobile device may prompt the web application to determine the dosage for all individuals in the group. In various embodiments, members of the group may individually prompt the web application to determine their dosages with different mobile devices. The server system 205 may store the determined dosages of the group in the storage until the user instructs the server system 205 to print a label 245.

FIG. 2B is an exemplary embodiment of a schematic for an embodiment of a system 260 for providing sunscreen to an individual. The label 265 may include amounts for one or more individuals. In various embodiments where the bottle is relatively small, such as the bottle shown in FIG. 2B, the label may include only one individual, as shown on the label 265.

Figure 3:
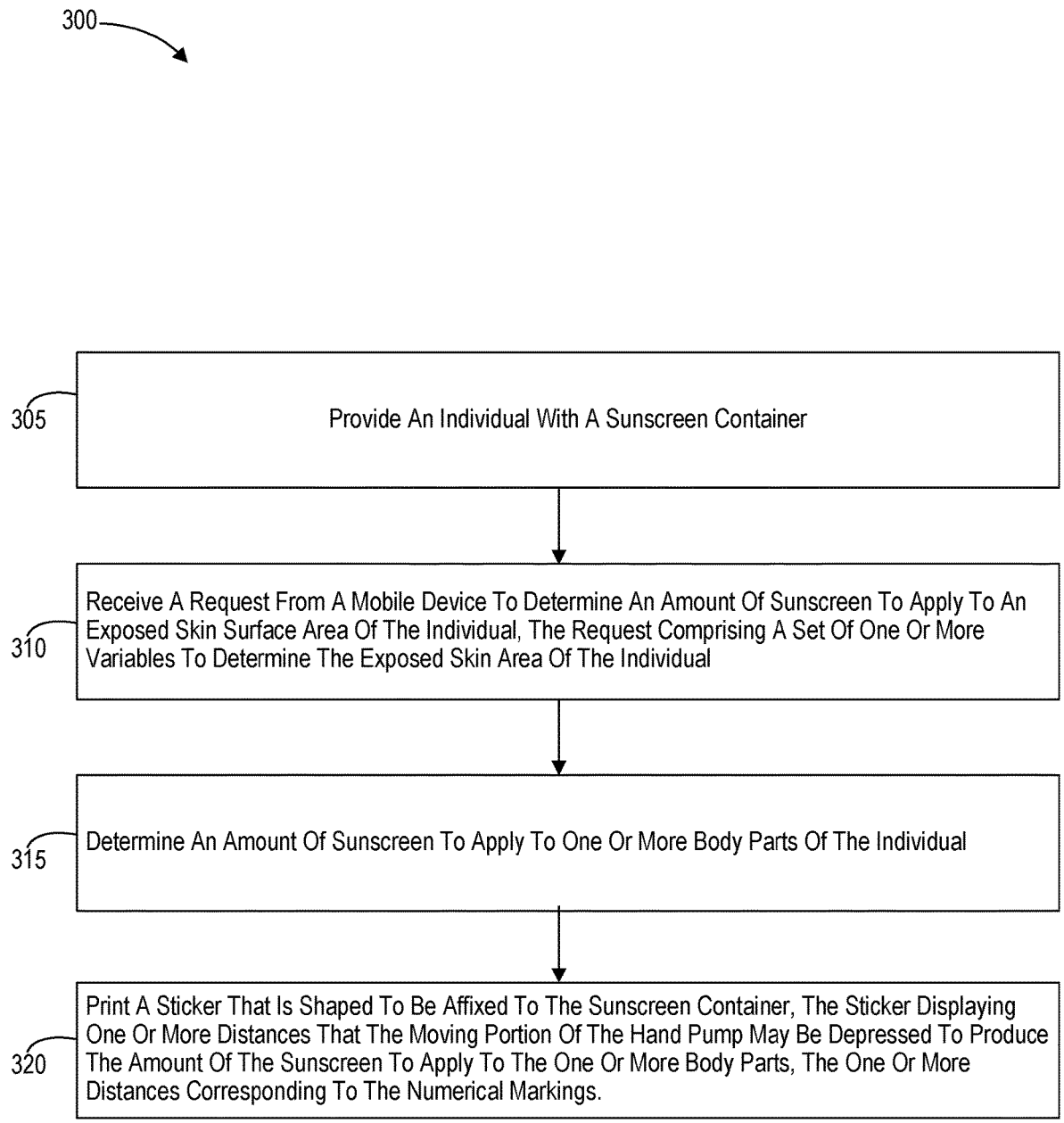
FIG. 3 is a flow diagram of an embodiment of a process for providing a correct dosage of sunscreen to an individual.

Referring to FIG. 3, FIG. 3 is a flow diagram of an embodiment of a process 300 for providing a correct dosage of sunscreen to an individual. The correct dosage for an individual may be printed on a label that is configured to be affixed to a sunscreen bottle 100. The individual may check the label before precisely measuring the correct dosage of sunscreen.

In various embodiments, lotions or the like with active ingredients that perform functions other than preventing sunburn may be substituted for sunscreen. For example, lotions that prevent wrinkles, reduce undereye darkening, or reduce acne may be substituted for sunscreen in the sunscreen bottle. In all cases, an amount of treatment lotion may be calculated by a web application based on known formulas and variables that are supplied by a user. The web application may calculate a dosage whereby an individual may measure the dosage using the bottle disclosed herein.

At step 305, the process 300 may provide an individual with a sunscreen container. In various embodiments, the sunscreen container may be sold to the individual. In an exemplary embodiment, the sunscreen container may be mailed to the individual as part of a subscription plan. The sunscreen container may comprise various shapes and sizes and contain various active ingredients. The non-active ingredients of the sunscreen may comprise various mixtures such as lotions and the like.

At step 310, the process may receive a request from a mobile device to determine an amount of sunscreen to apply to an exposed skin surface area of the individual where the request comprises a set of one or more variables to determine the exposed skin area of the individual. In an exemplary embodiment, the request is responsive to the mobile device executing instructions that are coded in a label, such as a QR code on the sunscreen container. In various embodiments, the request is responsive to the individual directly navigating to a URL of a web application without scanning a digital label on the sunscreen container.

At step 315, the process 300 may determine an amount of sunscreen to apply to one or more parts of the individual. The amount of sunscreen may be determined based on an exposed skin area of the individual. Because all individuals are unique, the individual may enter variables such as height, weight, age, and sex to determine a total skin area. The total skin area may be calculated based on a variety of formulas such as disclosed in equation 1 and equation 2 as well as combinations thereof. Further, the process may determine an exposed skin area that is less than or equal to the total skin area based on hair and clothing coverage. Accordingly, the individual may enter details describing their clothing and hair coverage. The web application may prompt the individual to input an amount of baldness to determine an exposed skin area on the individual's head.

At step 320, the process may print a sticker that is shaped to be affixed to the sunscreen container where the sticker displays one or more distances that the moving portion of the hand pump may be depressed to produce the amount of the sunscreen to apply to the one or more body parts where the one or more distances correspond to the numerical markings. An example of the body parts may be the arms, legs, abdomen, chest, back, and face. The amounts of sunscreen for the different body parts may be heavily dependent on the hair and clothing coverage of the individual. The individual may use the sticker as a reference to produce a correct amount of sunscreen for each of the individual's body parts without the need to guess.

Figure 4:
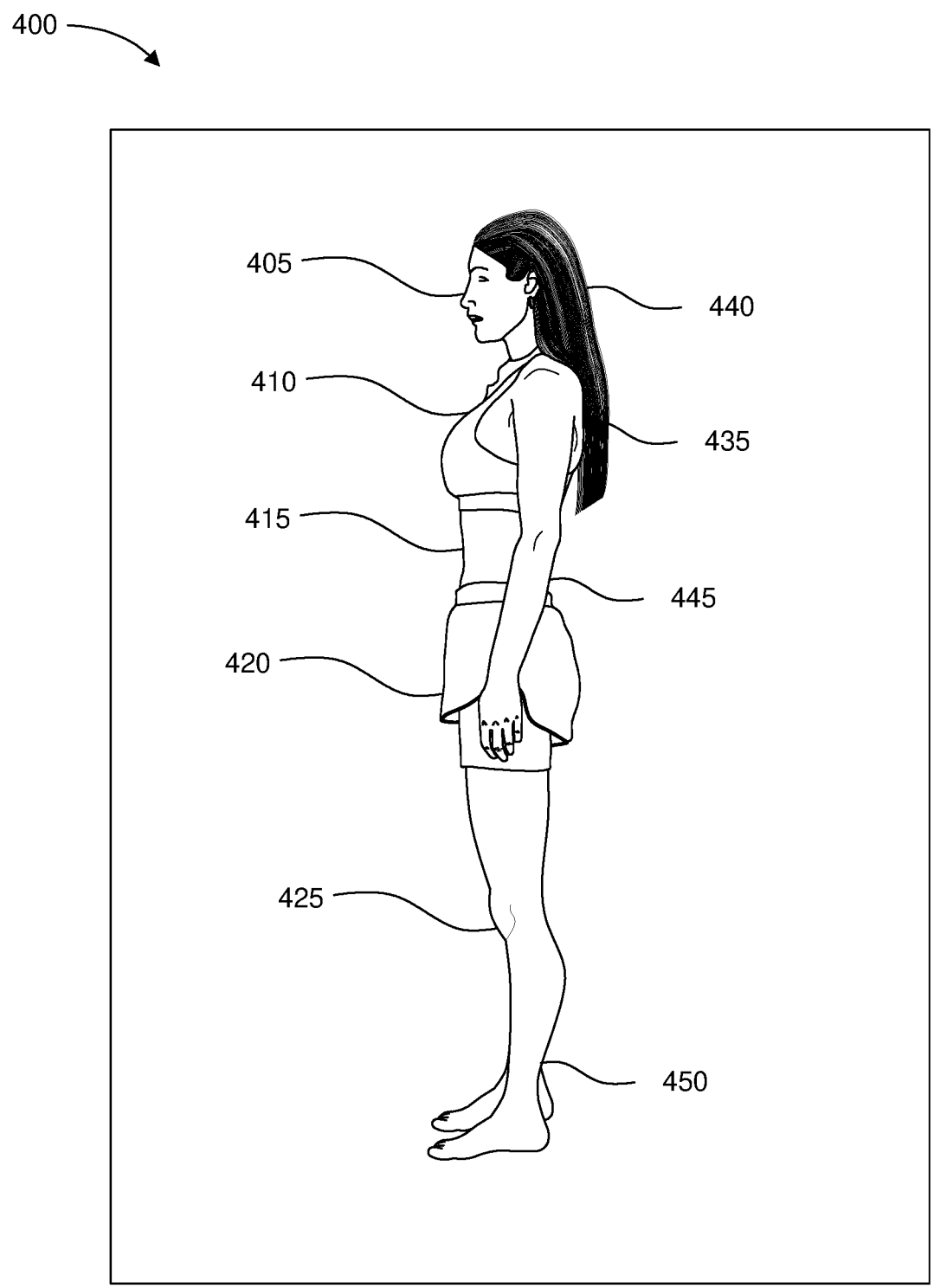
FIG. 4 is an illustration of a female with an exposed skin area for whom a calculation may be made in accordance with the disclosed subject matter to provide a dosage of sunscreen.

Referring to FIG. 4, FIG. 4 is an illustration of a female individual 400 with an exposed skin area for whom a calculation may be made in accordance with the disclosed subject matter to provide a dosage of sunscreen. The individual 400 may connect to the server system 205 to open a web application to determine the correct dosage of sunscreen to apply based on her exposed skin area. In various embodiments, a total skin area may be determined from an average value given by equation 1 and equation 2 above. From the value of the total skin area, the exposed skin area may be determined based on the individual's clothing and hair coverage.

In an exemplary embodiment, the web application may calculate an exposed skin area based on a rule of 9. Accordingly, the skin area of the individual's head 405 may account for 9% of the total skin area. However, because the individual has a substantial hair 440 coverage, the exposed skin area of the head may be reduced to 4% of the total skin area. The chest 410 and abdomen 415 together may account for 18% of the total skin area, however, the exposed area of the chest 410 and abdomen 415 may be reduced to 13% of the total skin area because the individual 400 is wearing a sports bra. Likewise, the upper portion of the back 445, which may account for 9% of the total skin area, is partially covered by the sports bra and hair 435. The upper portion of the back and lower part of the back 445 together account for 18% of the total skin area. After reducing the total back area due to the sports bra, the back may account for 13% of the exposed skin area.

In various embodiments, the abdomen 415 may account for 9% of the total skin area, and since the individual's abdomen 415 is uncovered, the exposed skin area of the abdomen is also 9% of the total skin area. Similarly, the lower part of the back 445 is uncovered. Since the lower part of the back may account for 9% of the total skin area, the exposed skin area of the back also accounts for 9% of the total skin area. Each of the legs may account for 18% of the total skin area. Each leg may be divided whereby the upper legs and lower legs account for 9% of the total skin area. The feet and ankles 450 are bare, which leaver the lower legs completely uncovered. The upper legs are partially covered by shorts 420 of medium length. Accordingly, the exposed skin area of each of the right and left upper legs may account for 5% of the total skin area.

The lower legs 425, which are not covered, may each account for 9% of the total skin area. And since the individual's right and left arms are uncovered, the exposed skin area of each of the arms may be 9% of the total skin area.

If the individual 400 weighs 60 kg and has a height of 170 cm, the total skin area may be calculated from the Haycock formula as follows:

$$0.024265 * 60 \text{ kg}^{0.5378} * 170 \text{ cm}^{2^{0.3964}} = 1.680 \text{ m}^2 \quad (3)$$

and the total skin area may be calculated from the Mosteller formula as follows:

$$0.016667 * 60 \text{ kg}^{0.5} * 170 \text{ cm}^{2^{0.5}} = 1.683 \text{ m}^2 \quad (4)$$

The average value of the total of the Haycock formula and Mosteller formula is 1.682 m² which is equal to 16820 cm². Since, the recommended dosage of sunscreen is 2 mg/cm², the web application may produce the following dosage table for the individual's 400 various body parts.

| Body Part | Exposed skin area (% total skin area) | Exposed skin area (cm²) | Sunscreen Dosage (mg) |
|---|---|---|---|
| Head | 4% | 673 | 1346 |
| Chest and abdomen | 13% | 2186 | 4372 |
| Back | 13% | 2186 | 4372 |
| Arms | 9% | 1514 | 3028 |
| Upper Legs | 5% | 841 | 1682 |
| Lower Legs | 9% | 1514 | 3028 |

The following dosage table shows an exemplary embodiment of the disclosed subject matter wherein the skin area for the chest and abdomen are separated and the upper back and lower back are separated.

| Body Part | Exposed skin area (% total skin area) | Exposed skin area (cm²) | Sunscreen Dosage (mg) |
|---|---|---|---|
| Head | 4% | 673 | 1346 |
| Chest | 4% | 673 | 1346 |
| Abdomen | 9% | 1514 | 3028 |
| Upper Back | 4% | 673 | 1346 |
| Arms | 9% | 1514 | 3028 |
| Upper Legs | 5% | 841 | 1682 |
| Lower Legs | 7% | 1514 | 3028 |

Figure 5:
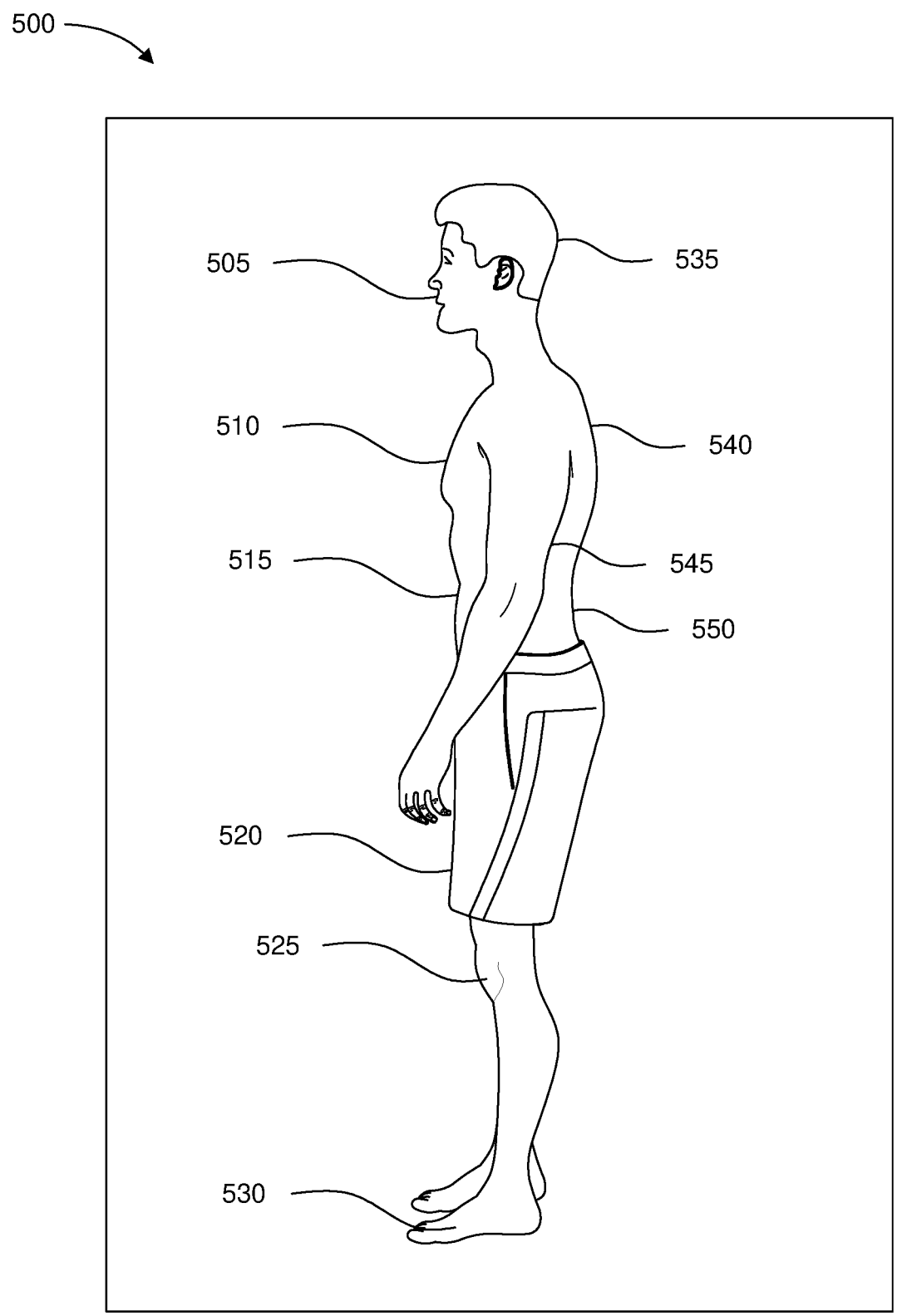
FIG. 5 is an illustration of a male with an exposed skin area for whom a calculation may be made in accordance with the disclosed subject matter to provide a dosage of sunscreen.

Referring to FIG. 5, FIG. 5 is an illustration of a male individual 500 with an exposed skin area for whom a calculation may be made in accordance with the disclosed subject matter to provide a dosage of sunscreen. As shown in FIG. 5 the individual 500 has short cut hair and is wearing knee length shorts and shoes. If the individual weighs 85 kg and is 180 cm tall, the average value of the Haycock formula and Mosteller formula is 2.067 m² for total skin area. The exposed skin area for the individual's various body parts may be represented as a percentage of the total skin area.

Using the rule of 9, the head 505, may account for 9% of the total skin area. Since the head 505 is covered by hair 535, the exposed skin area of the head 505 may account for 4% of the total skin area. The trunk area, which comprises the chest 510, abdomen 515, upper back 540, and lower back 550, is not covered. Accordingly, the exposed skin area of each of the chest/abdomen and back account for 18% of the total skin area. In an exemplary embodiment that separates the trunk into the chest 510, abdomen 515, upper back 540, and lower back 550, the chest 510, abdomen 515, upper back 540, and lower back 550 may each account for 9% of the total skin area. Similarly, the arms 545 are not covered and may each account for 9% of the total skin area.

Since the upper legs are mostly covered by the shorts 520, the exposed skin area of each of the upper left and upper right legs may account for just 1% of the total skin area. The lower legs 525 are not covered, as the individual's feet 530 are bare. Accordingly, the lower legs 525 may each account for 9% of the total skin area. Using the percentages for exposed skin area determined in the preceding paragraphs, the web application may produce the following sunscreen dosages for the individual's 500 various body parts:

| Body Part | Exposed skin area (% total skin area) | Exposed skin area (cm²) | Sunscreen Dosage (mg) |
|---|---|---|---|
| Head | 4% | 827 | 1654 |
| Chest and abdomen | 18% | 3721 | 7442 |
| Back | 18% | 3721 | 7442 |
| Arms | 9% | 1861 | 3722 |
| Upper Legs | 1% | 207 | 414 |
| Lower Legs | 9% | 1861 | 3722 |

The following dosage table shows an exemplary embodiment of the disclosed subject matter wherein the skin area for the chest and abdomen are separated and the upper back and lower back are separated.

| Body Part | Exposed skin area (% total skin area) | Exposed skin area (cm²) | Sunscreen Dosage (mg) |
|---|---|---|---|
| Head | 4% | 827 | 1654 |
| chest | 9% | 1861 | 3722 |
| Abdomen | 9% | 1861 | 3722 |
| Upper Back | 9% | 1861 | 3722 |
| Arms | 9% | 1861 | 3722 |
| Upper Legs | 1% | 207 | 414 |
| Lower Legs | 9% | 1861 | 3722 |

Figure 6:
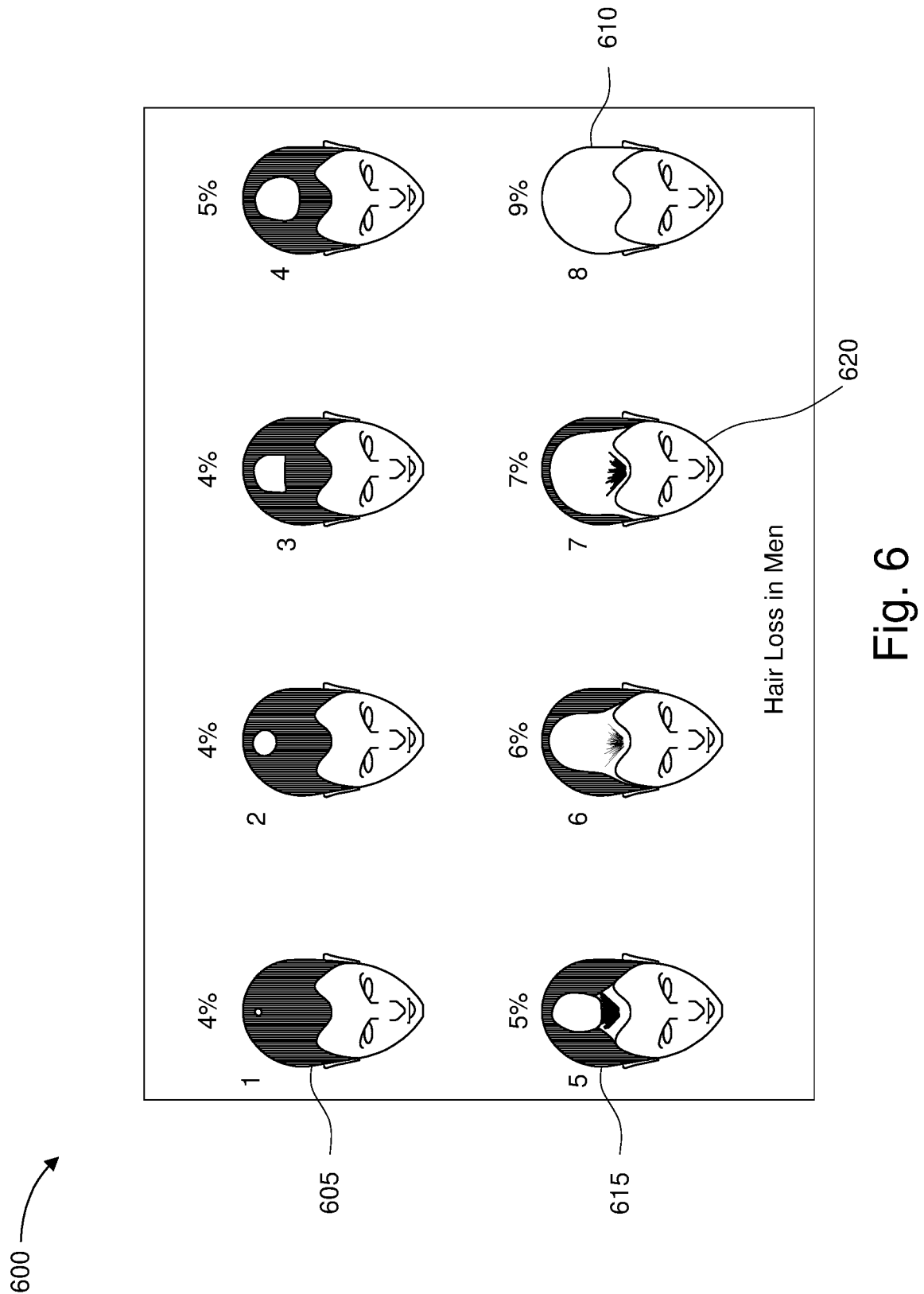
FIG. 6 is an illustration of a Hamilton-Norwood chart that shows various degrees of baldness in men for whom a calculation may be made in accordance with the disclosed subject matter to provide a dosage of sunscreen.

Referring to FIG. 6, FIG. 6 is an illustration 600 of a Hamilton-Norwood chart that shows various degrees of baldness in men for whom a calculation may be made in accordance with the disclosed subject matter to provide a dosage of sunscreen. As hair coverage may partially protect an individual's head from UV radiation, the calculation for an amount of sunscreen for the head is dependent on an amount of hair or baldness of an individual. Since it may be difficult for the individual to determine their amount of baldness, the web application may aid the individual by providing the images shown in FIG. 6 as examples of various degrees of baldness.

The image 605 shows no baldness. An individual with no baldness may receive maximum protection from UV radiation. Accordingly, an exposed skin area of the head for a person with no baldness may be 4% of the total skin area. The images shown on the top row of FIG. 6 show various degrees of light baldness. The image 615 shows moderate baldness. The exposed skin area of the head of an individual with moderate baldness as shown in image 615 may be 5%. An individual with more severe baldness, as shown in image 620, may be determined to have an exposed skin area of the head as 7% of the total skin area. And an individual with a shaved head, as shown in image 610, will have no protection and accord an exposed skin area of the head as 9% of the total skin area.

Figure 7:
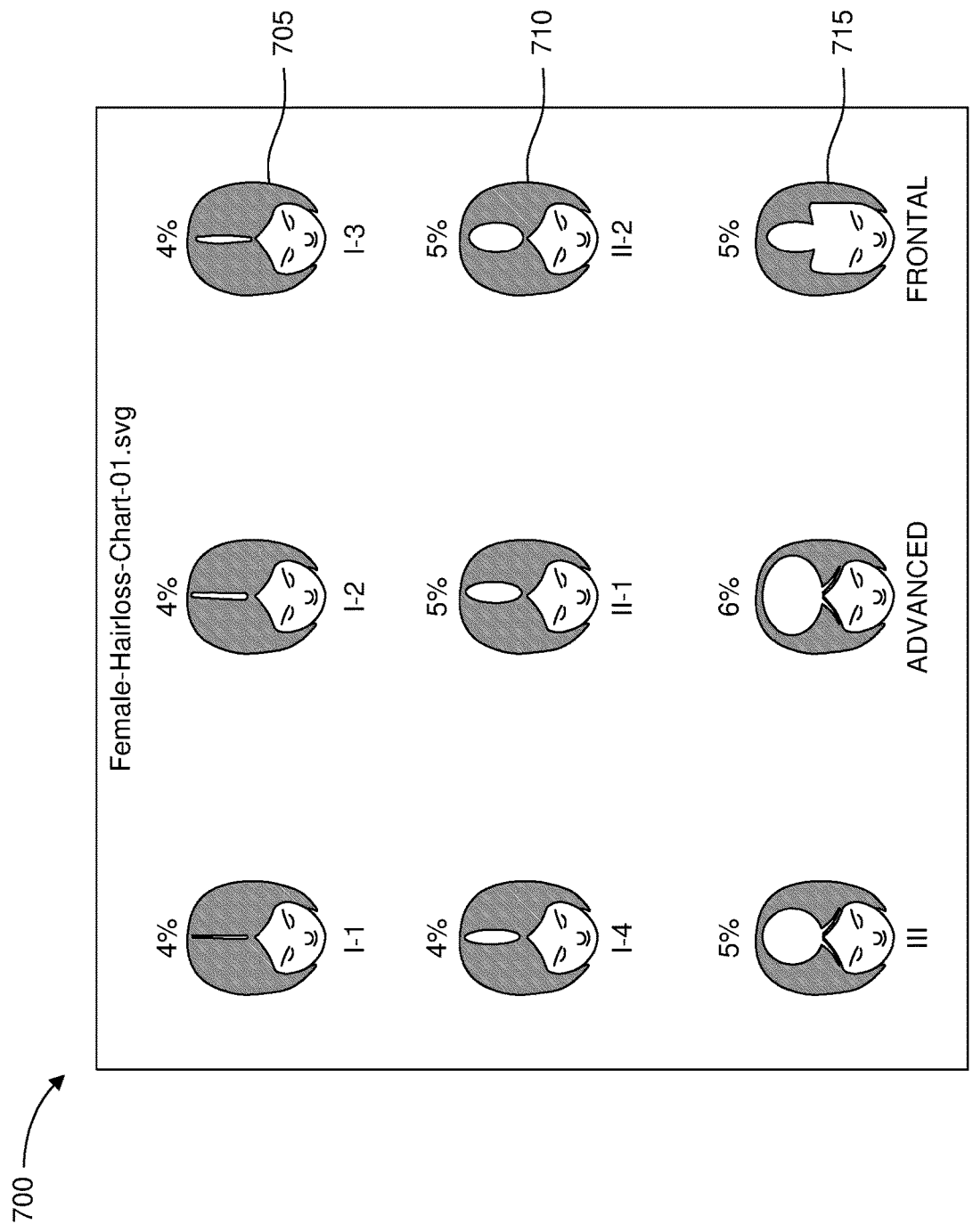
FIG. 7 is an illustration of a Ludwig's classification for various degrees of baldness in women for whom a calculation may be made in accordance with the disclosed subject matter to provide a dosage of sunscreen.

Referring to FIG. 7, FIG. 7 is an illustration 700 of a Ludwig's classification for of various degrees of baldness in women for whom a calculation may be made in accordance with the disclosed subject matter to provide a dosage of sunscreen. The web application may prompt a user to input their degree, if any, of baldness. Because there is a wide discrepancy between the incidence of baldness between men and women, the web application may present different baldness degree for female and male individuals.

For female individuals, the web application may present various options for a user to select a degree of baldness. The options may include images, such as the images shown in FIG. 7, of various degrees of baldness in female heads. For instance, the web application may present images of light baldness 705, intermediate baldness 710, and severe baldness 715. A user may input the corresponding degree of baldness to determine a sunscreen dosage. As shown in FIG. 7, individuals with light baldness may be determined to have an exposed skin area on the head that is 4% of the total skin area of the body. Individuals with moderate baldness may be determined to have an exposed skin area of between 4%-5% of the total skin area. And individuals with more severe baldness may be determined to have an exposed skin area on the head of between 5%-6% of the total skin area.

Figure 8:
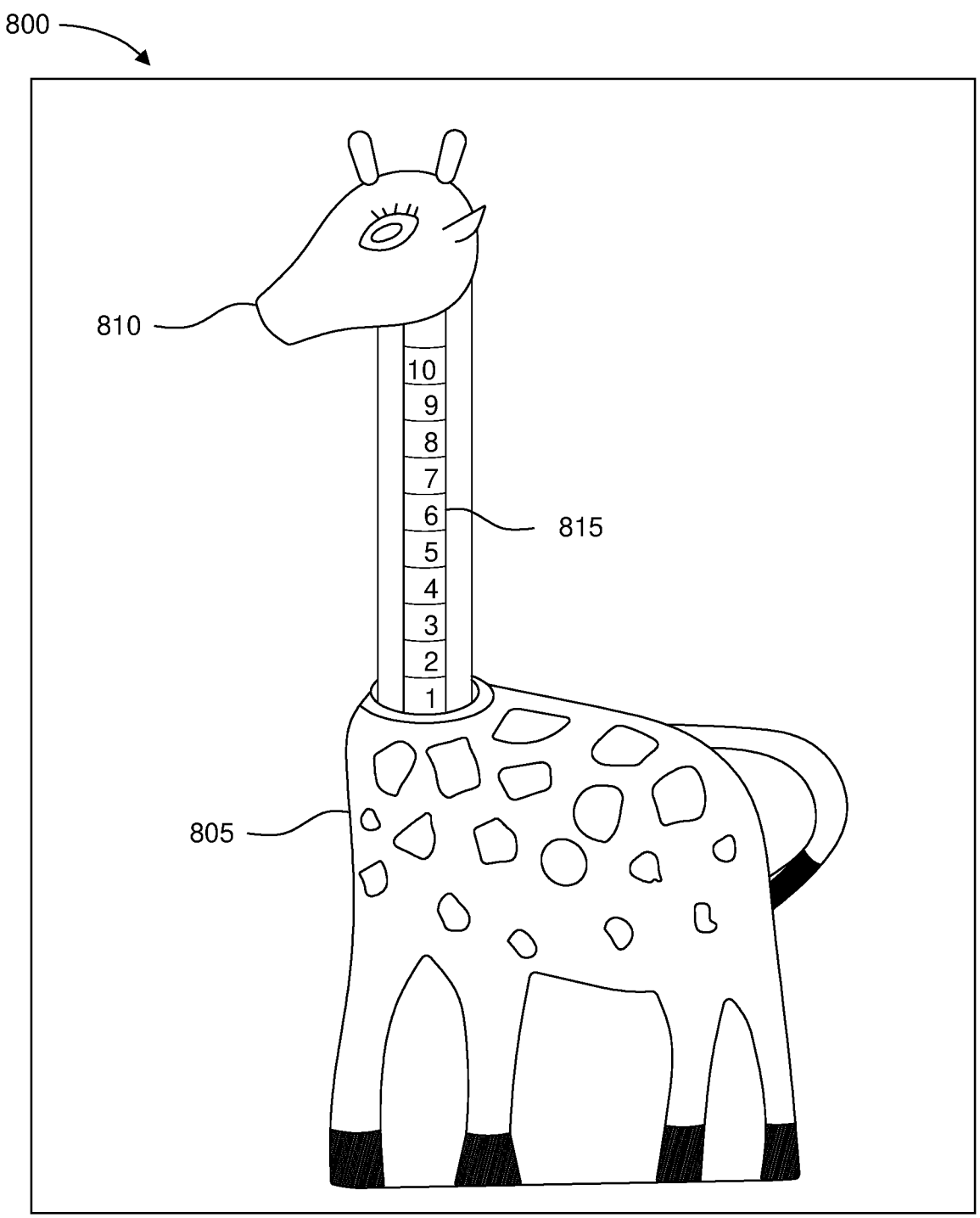
FIG. 8 is an illustration of a stylized embodiment of the sunscreen container.

Referring to FIG. 8, FIG. 8 is an illustration of a stylized embodiment of the sunscreen bottle 800. The sunscreen bottle 800 may comprise various shapes and sizes that may be stylized. For the embodiment shown in FIG. 8, the sunscreen bottle 800 is generally stylized into the shape of a giraffe. The neck portion of the sunscreen bottle 800 includes syringe style markings 815 to indicate an amount of sunscreen that is pumped as the hand pump 810 is activated.

The reservoir 805 of the sunscreen bottle 800 may be shaped to accommodate a length of the neck as the neck is pushed into the reservoir 805. The long neck of the giraffe nicely coincides with the long neck of the sunscreen bottle. Other long necked animal shapes such as dinosaurs and various birds may similarly embody the shape of the sunscreen bottle.

Figure 9:
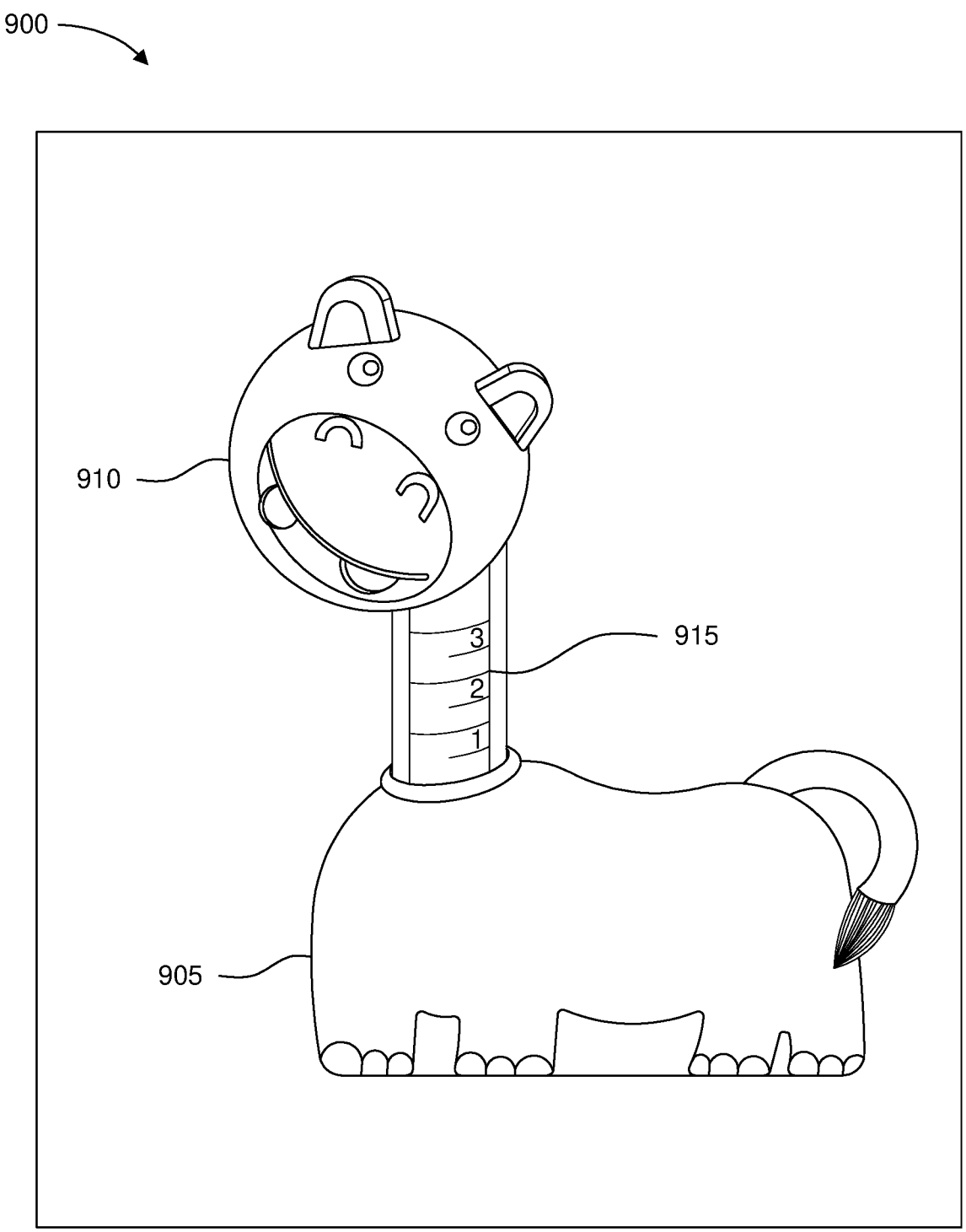
FIG. 9 is an illustration of a stylized embodiment of the sunscreen container.

Referring to FIG. 9, FIG. 9 is an illustration of another stylized embodiment of the sunscreen bottle 900. As shown in FIG. 9, the sunscreen bottle 900 is generally shaped as a hippopotamus. Like the giraffe, the neck portion of the sunscreen bottle 900 is made to look like the neck of a hippopotamus. Because the hippopotamus shape has a shorter neck than the giraffe shape shown in FIG. 8, the sunscreen bottle 900 comprises a thicker neck 915 than the neck area shown in FIG. 8 to accommodate a greater volume of sunscreen per unit of length of the neck. Thus, a greater amount of sunscreen is pumped per distance that the hand pump 910 is depressed relative to the sunscreen bottle 800 shown in FIG. 8. Further, because of the short neck length in the sunscreen bottle 900, the space to accommodate the neck in the reservoir 905 does not have to be as big as the space required in the sunscreen bottle 800 shown in FIG. 8.

Figure 10:
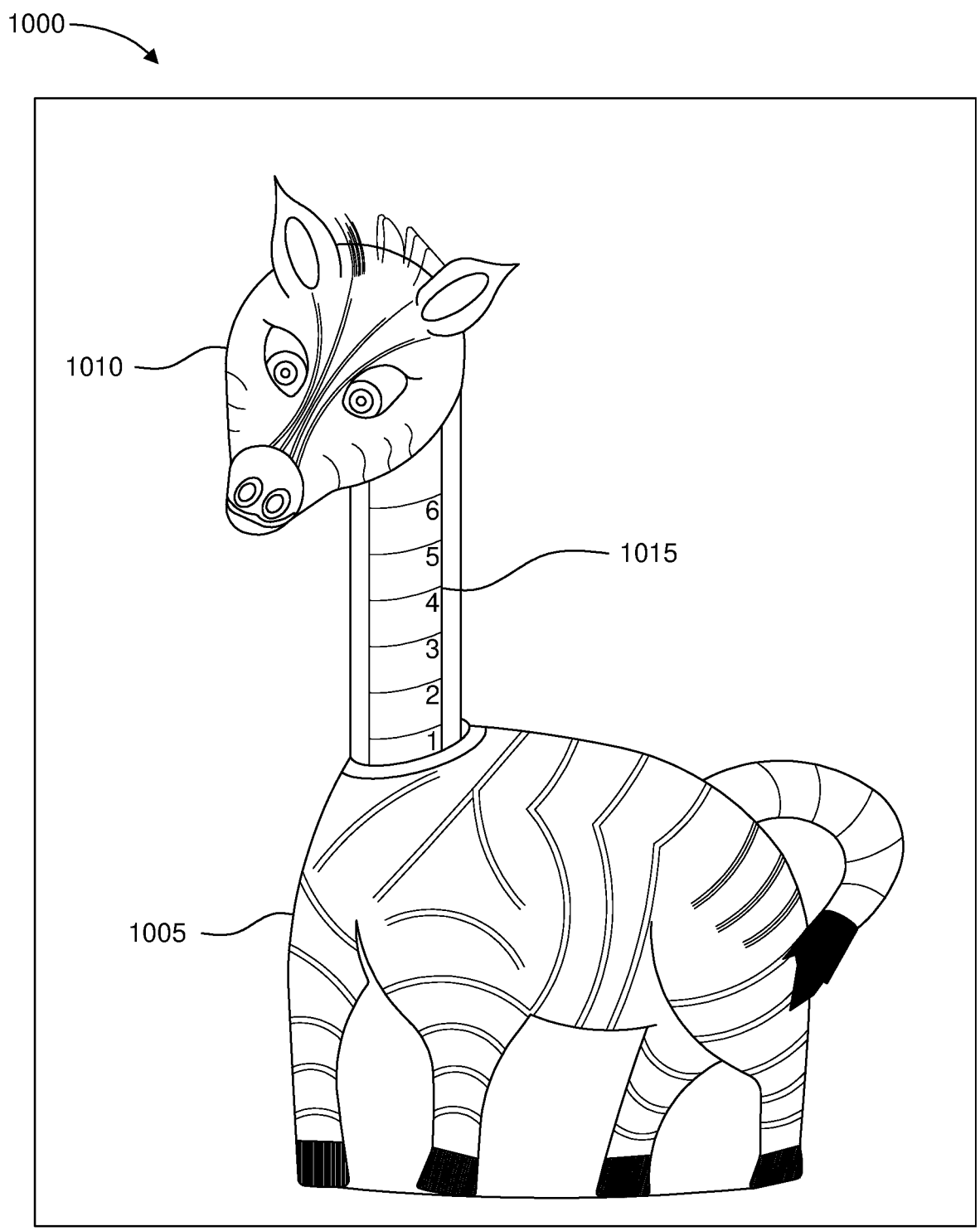
FIG. 10 is an illustration of a stylized embodiment of the sunscreen container.

Referring to FIG. 10, FIG. 10 is another illustration of a stylized embodiment of the sunscreen bottle 1000. The dimensions of the sunscreen bottle 1000, which has the general shape of a zebra, has a neck length that is in between the longer length of the sunscreen bottle 800 shown in FIG. 8 and the shorter sunscreen bottle 900 shown in FIG. 9. Accordingly, the width of the neck is adjusted to be thicker than the sunscreen bottle 800 shown in FIG. 8 and thinner than the sunscreen bottle 900 shown in FIG. 9.

The space within the reservoir 1005 may be adjusted to accommodate the neck 1015 of the sunscreen bottle 1000 as the hand pump 1010 of the sunscreen bottle is depressed. As shown in FIGS. 8-10, the neck width and length may be inversely proportional. Stylized shapes that necessitate a long neck may also necessitate the neck to be thin so as not to pump too much sunscreen per activation of the hand pump. Likewise, shapes that necessitate a thin or thick neck may require the length of the neck to be adjusted accordingly.

Figure 11A:
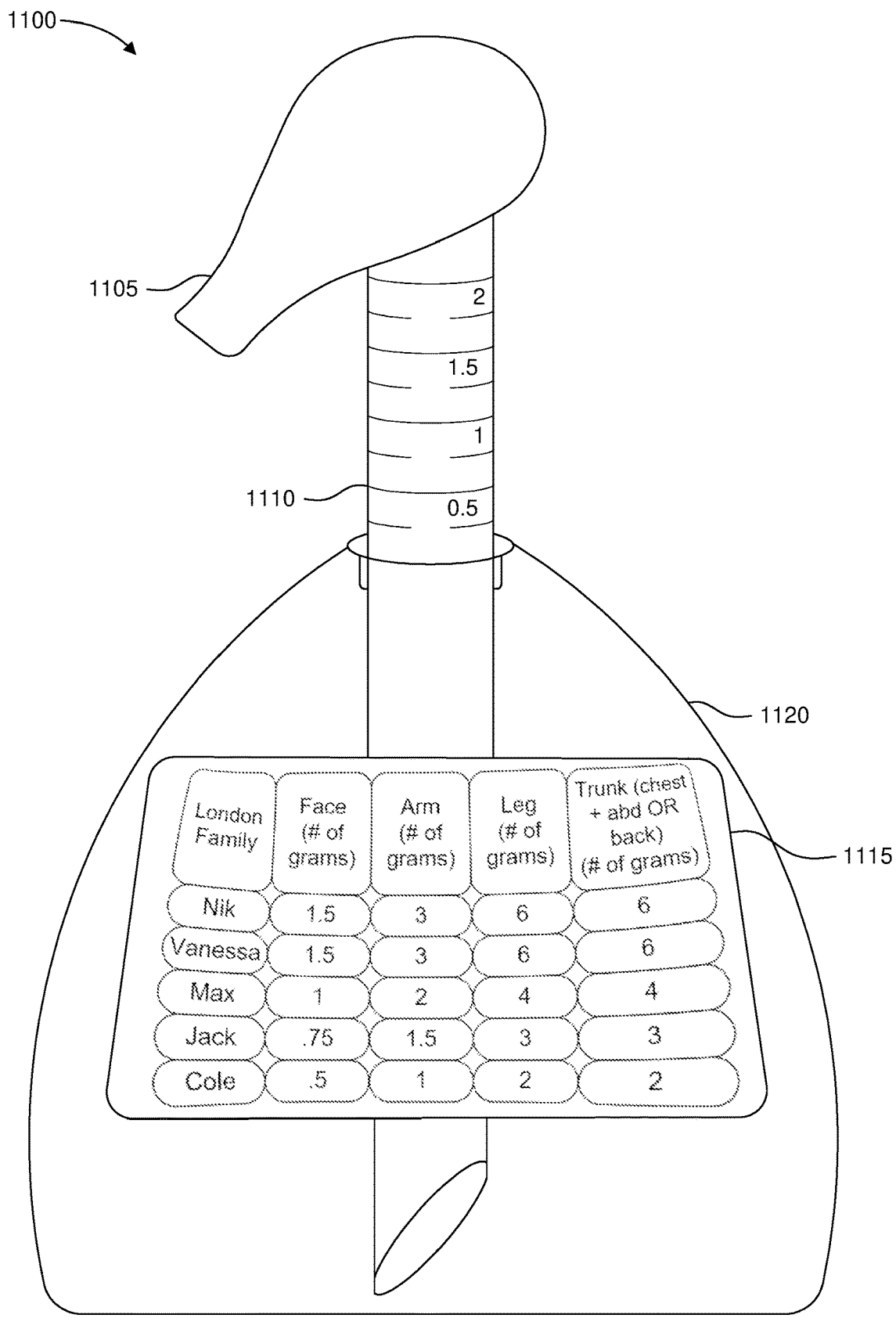
FIG. 11A is an illustration of an embodiment of the sunscreen container with an affixed sticker that is printed according to an embodiment of the disclosed subject matter.
Figure 11B:
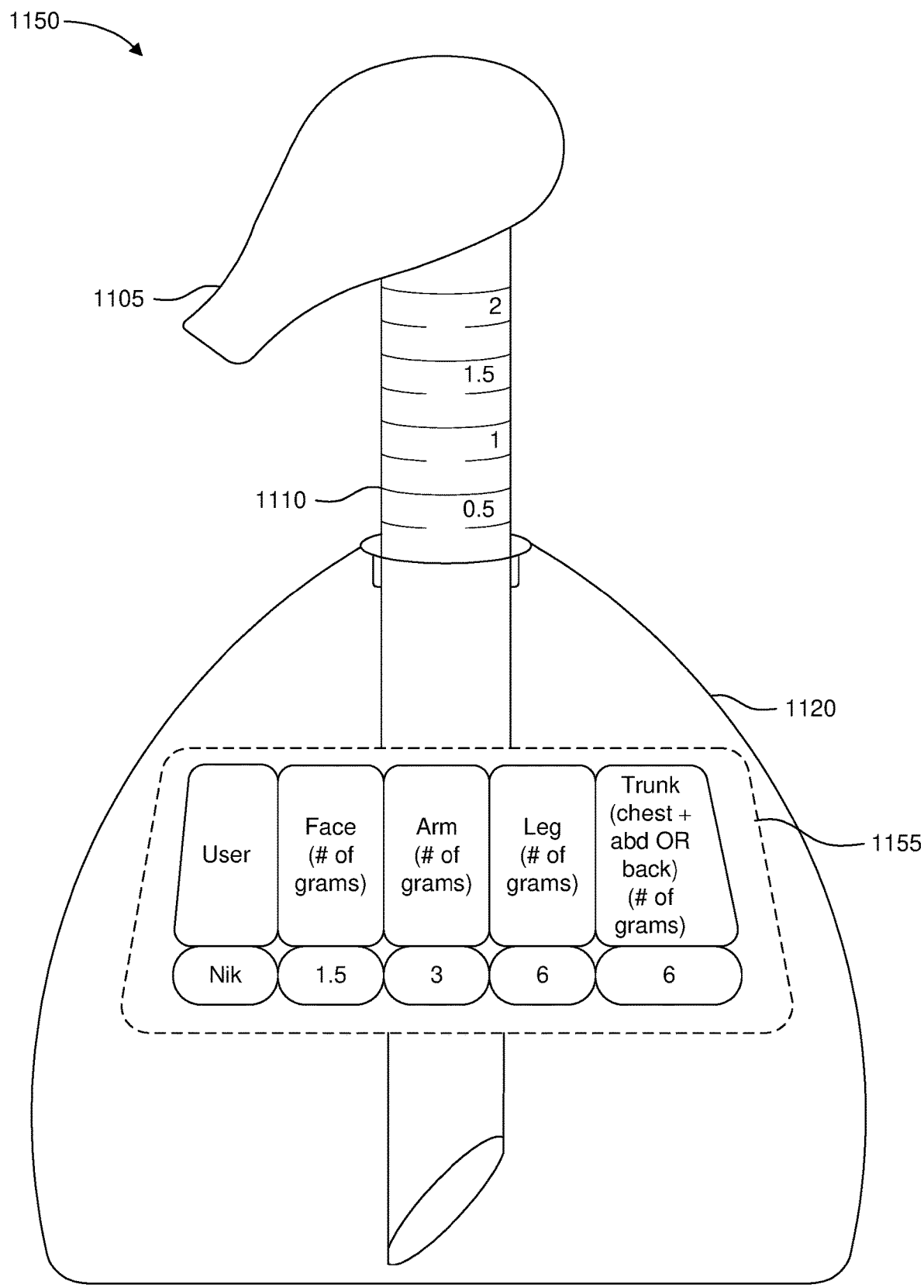
FIG. 11B is an illustration of an embodiment of the sunscreen container with an affixed sticker that is printed according to an embodiment of the disclosed subject matter.

Referring to FIG. 11A and FIG. 11B, FIG. 11A is an illustration 1100 of an embodiment of the sunscreen container with an affixed sticker 1115 that is printed according to an embodiment of the disclosed subject matter. The sticker 1115 may serve as a reference of a correct sunscreen dosage for one or more individuals. In various embodiments, the sticker 1115 may display the dosages for a group of individuals, such as the family names shown on the sticker 1115.

The web application may provide a user with options to create a group profile such that the members of the group may be printed together on a single sticker 1115. The sticker 1115 may display a sunscreen dosage for the various members of the group. Further, the sunscreen dosage may be broken down into dosages for the various body parts. The embodiment shown in FIG. 11A shows dosages for the face, arm, leg, and trunk portions of the body. The dosages of the sticker 1115 and the syringe style markings 1110 are in units of grams. Accordingly, the members of the group may measure a dosage of sunscreen referenced on the sticker 1115 by depressing the hand pump 1105 of the sunscreen bottle 1120 a length that corresponds to the dosage.

In an example of use for the family member Jack, Jack may depress the hand pump 1105 down three of the syringe style markings 1110 to pump 0.75 g of sunscreen for his face. Similarly, Jack may depress the hand pump 1105 down six of the syringe style markings 1110 to pump 1.5 g of sunscreen for each of his arms. To pump 3 g of sunscreen for each of his legs and for his trunk, Jack may fully depress the hand pump 1105 once to pump 2 g and depress the hand pump down four of the syringe style markings 1110 to pump an additional 1 g of sunscreen.

In various embodiments, the sticker 1115 may be shaped based on the shape of the sunscreen bottle 1120. As shown in FIG. 11A, the sticker is tapered such that the bottom is thicker than the top of the sticker 1115, which is the general shape of the sunscreen bottle 1120. In the embodiment of the sunscreen bottle shown in FIG. 12, the sticker is shaped differently to fit the dimensions of a stylized sunscreen bottle.

FIG. 11B is an illustration 1150 of an embodiment of the sunscreen container with an affixed sticker 1155 that is printed according to an embodiment of the disclosed subject matter. The affixed sticker 1155 includes amounts of sunscreen to apply for a single individual. In various embodiments that are not shown, the affixed sticker may include one or more blank rows that may be filled in by the user. For example, a user may fill in the amounts of sunscreen based on calculated amounts from the web application. In various embodiments, the web application may allow the user to select full-pump amounts where the user only fully depresses the hand pump 1105. Thus, the user need not concentrate on depressing the hand pump 1105 to the correct syringe style markings 1110.

Referring to FIG. 12, FIG. 12 is an illustration 1200 of a stylized embodiment of the sunscreen container with an affixed sticker that is printed according to an embodiment of the disclosed subject matter. The sticker 1220 is shaped to fit the general dimensions of the sunscreen bottle 1205. Accordingly, the sticker 1220 is horizontally elongated relative to the sticker 1115 shown in FIG. 11A. Further, the vertical length of the sticker 1220 is shorter in the middle of the sticker 1220 to fit the general shape of the sunscreen bottle 1205.

In various embodiments, a user may possess two or more sunscreen bottles and affix stickers 1220 for different family members on each of the sunscreen bottles. In one example, young children may be assigned a stylized sunscreen bottle that is separate from other members of the group. In another example, the same member of the group may have multiple stickers 1220 that correspond to different clothing that they may wear. For instance, a sticker 1220 may include dosages for individuals as they wear a minimal amount of clothing such as a bathing suit. Another sticker 1220 may include dosages for the same individuals as they wear significantly more clothing such as a summer outfit.

In various embodiments, dosages may be determined in numbers of full pumps. The reasoning is that full pumps require less concentration than performing partial pumps to achieve a specific mass of sunscreen. Accordingly, the full pumps could be rounded up based on the mass of sunscreen for each body part. In the example given for FIG. 12, the number of full pumps for Nik in FIG. 12 could be 1 pump for the face, 1 pump for each of the arms, 2 pumps for each of the legs, and 2 pumps for the trunk.

In an exemplary embodiment, a customized cup with a line representing a volume that corresponds to an amount of sunscreen for one or more body parts may be provided. Thus, a user may simply fill the cup to the correct volume and use that amount of sunscreen. In one example, the customized cup includes a volume line representing a total volume of sunscreen to apply to the body of a specific individual. Multiple cups may be used with a single bottle of sunscreen where each cup corresponds to a different individual. In another example, a single customized cup may include multiple volume lines that each correspond to a different individual.

The various embodiments disclosed herein for a sunscreen bottle and processes for calculating sunscreen dosages and producing a sticker for the dosages are not intended to limit the disclosed subject matter. All the disclosed embodiments provide examples which are a fraction of all possible embodiments. Indeed, the disclosed subject matter encompasses all possible embodiments including combinations of embodiments and is instead limited by the appended claims.

The invention claimed is:

1. A sunscreen container system, the sunscreen container system comprising:
   a reservoir for holding a volume of sunscreen;
   a hand pump in fluid connection with the reservoir;
   a moving portion of the hand pump comprising outward facing numerical markings that indicate a volume of sunscreen that is pumped based on a movement of the hand pump; and
   a computer system with a processor and memory, the memory comprising instructions that, when executed by the processor, cause the processor to:
      receive a request to determine an amount of sunscreen to apply to an exposed skin surface area of an individual, the request comprising a set of one or more variables to determine the exposed skin surface area of the individual, the one or more variables comprising a level of baldness for the individual;
      prompt to enter a level of baldness of the individual; and
      determine an amount of sunscreen to apply to one or more body parts of the individual based on the one or more variables and the level of baldness, the amount corresponding to at least one of the numerical markings.

2. The sunscreen container system of claim 1, further comprising an outward facing digital label, the digital label containing instructions that, when executed on a mobile device, cause the mobile device to connect to the computer system.

3. The sunscreen container system of claim 2, wherein the set of one or more variables comprises:
   an age of the individual;
   a sex of the individual;
   a height of the individual; and
   a weight of the individual.

4. The sunscreen container system of claim 3, wherein the set of variables further comprise a clothing coverage of the individual.

5. The sunscreen container system of claim 3, wherein the memory comprises an instruction that, when executed, causes a printer to print a sticker that is shaped to be affixed to the reservoir.

6. The sunscreen container of system claim 5, wherein the sticker comprises a numerical print of the amount of sunscreen to apply to the individual.

7. A system for providing an accurate dose of sunscreen to an individual, the system comprising:
   a sunscreen container, the sunscreen container comprising:
      a reservoir for holding a volume of sunscreen;
      a hand pump in fluid connection with the reservoir;
      a moving portion of the hand pump comprising outward facing numerical markings that indicate a volume of sunscreen that is pumped based on a movement of the hand pump; and
      an outward facing QR code, the QR code containing instructions that, when executed on a mobile device, cause the mobile device to connect to a sunscreen calculating application;
   a server with a processor and memory, the memory comprising instructions that, when executed by the processor, cause the processor to:
      receive a request from the mobile device to determine an amount of sunscreen to apply to an exposed skin surface area of the individual, the request comprising a set of one or more variables to determine the exposed skin surface area of the individual;
      prompt to enter a level of baldness of the individual;
      determine an amount of sunscreen to apply to one or more body parts of the individual; and
      cause a printer to print a sticker that is shaped to be affixed to the sunscreen container, the sticker displaying one or more distances that the moving portion of the hand pump may be depressed to produce the amount of the sunscreen to apply to the one or more body parts, the one or more distances corresponding to the numerical markings.

8. The system of claim 7, wherein the set of one or more variables comprise one or more of:
   an age of the individual;
   a sex of the individual;
   a height of the individual; and
   a weight of the individual.

9. The system of claim 8, wherein the set of one or more variables further comprise a clothing coverage of the individual.

10. The system of claim 7, wherein the one or more distances comprise:
a distance for a face body part;
a distance for an arm body part;
a distance for a leg body part; and
a distance for a trunk body part.

11. The system of claim 10, wherein the one or more distances further comprise a distance for a head body part.

12. The system of claim 7, wherein each of the outward facing numerical markings comprise prominences configured to produce an audible click as the outward facing numerical marking passes a non-moving measurement line.

13. The system of claim 11, wherein the one or more variables comprise a type of clothing; and
the amount of sunscreen to apply is determined based on the type of clothing.

14. The system of claim 13, wherein the distance for the arm body part is determined based on the type of clothing.

15. The system of claim 13, wherein the distance for the leg body part is determined based on the type of clothing.

16. The system of claim 13, wherein the distance for the trunk body part is determined based on the type of clothing.

\* \* \* \* \*